US008604919B2

(12) United States Patent
Otterson

(10) Patent No.: US 8,604,919 B2
(45) Date of Patent: Dec. 10, 2013

(54) DETERMINING STATUS OF HIGH VOLTAGE BATTERY FOR EMERGENCY RESPONDERS

(75) Inventor: Scott W. Otterson, Clinton Township, IL (US)

(73) Assignee: General Motors, LLC, Detroit, MI (US)

(*) Notice: Subject to any disclaimer, the term of this patent is extended or adjusted under 35 U.S.C. 154(b) by 589 days.

(21) Appl. No.: 12/862,960

(22) Filed: Aug. 25, 2010

(65) Prior Publication Data

US 2012/0050067 A1 Mar. 1, 2012

(51) Int. Cl.
*B60Q 1/00* (2006.01)

(52) U.S. Cl.
USPC ........... 340/438; 340/455; 340/459; 340/902; 340/904

(58) Field of Classification Search
USPC ................................ 340/438-439, 428, 455, 340/426.15-426.17, 902; 701/45, 201, 204; 455/521
See application file for complete search history.

(56) References Cited

U.S. PATENT DOCUMENTS 6,141,611 A * 10/2000 Mackey et al. .............. 701/32.2
6,240,365 B1 * 5/2001 Bunn ............................ 701/516
6,642,844 B2 * 11/2003 Montague ...................... 340/524
6,675,019 B1 * 1/2004 Thomson et al. ............. 455/521
6,738,697 B2 * 5/2004 Breed .......................... 701/31.5
6,980,124 B2 * 12/2005 Kong et al. .............. 340/870.11
7,271,716 B2 * 9/2007 Nou ......................... 340/539.13
7,663,502 B2 * 2/2010 Breed ........................ 340/12.25
2005/0012640 A1 * 1/2005 Kong et al. .............. 340/870.17
2010/0214055 A1 * 8/2010 Fuji et al. ....................... 340/3.1
2012/0150393 A1 * 6/2012 Knight-Newbury et al. ... 701/45
2013/0127611 A1 * 5/2013 Bernstein et al. ............. 340/455

* cited by examiner

*Primary Examiner* — Daniel Wu
*Assistant Examiner* — Son M Tang
(74) *Attorney, Agent, or Firm* — Leydig, Voit & Mayer, Ltd.

(57) ABSTRACT

The described method and system provide an early notification to emergency responders regarding a non-nominal condition associated with a vehicle involved in a collision. The system provides a short range wireless system controller in communication with a battery controller. The short range wireless system controller is further in communication with a communications device associated with an emergency responder via broadcast over a short range wireless RF network. If battery physical parameters indicate that the battery has suffered damage rendering the vehicle inoperable, this battery damage information is broadcast over the short range wireless RF network to the communications device associated with the emergency responder. In this way, the emergency responder can quickly aid incident victims without time lost in determining whether or not the high voltage vehicle battery is in a nominal state after the crash.

20 Claims, 4 Drawing Sheets

DETERMINING STATUS OF HIGH VOLTAGE BATTERY FOR EMERGENCY RESPONDERS

BACKGROUND OF THE INVENTION

Electric-only and hybrid electric vehicles have become increasingly capable and increasingly popular in recent years, as rising fossil fuel prices and improved battery technologies level the cost and performance fields between the vehicle types. Indeed, while the range and acceleration of production-level electric vehicles have historically lagged behind those of their fuel-powered counterparts, this situation is rapidly changing as high-capacity battery technologies are optimized and commercialized.

Nonetheless, despite the increasing parity between electric vehicles and fuel-powered vehicles, there are numerous differences between the vehicle types that require different handling and operational procedures. For example, the voltage present in a fuel-powered vehicle is generally fairly low, e.g., 12 volts, with the exception of certain sheltered areas such as spark plugs and ignition-related capacitors and transformers. In contrast, the core power system in an electric, hybrid or extended range electric vehicle utilizes high voltage and current levels.

While these high voltages are beneficial in providing the efficiency and power levels required in electric vehicles, they may also pose a hazard to personnel in certain circumstances of misuse or inadvertent damage. For example, when an electric vehicle having a high voltage battery is involved in a collision or incident of sufficient severity to disturb the battery casing or battery connections and contacts, the high voltage of the battery may be exposed to personnel, such as emergency responders, via exposed wiring or charged surfaces.

Thus, first responders to vehicle incident scenes that a potential involve a high voltage hazard are required to first test the environment, i.e., frame, metal roadway items such as railings in contact with the vehicle, and so on, to ensure that there is no electrical hazard present. If an electrical hazard exists, the responders will adjust their rescue strategy to eliminate the hazard if possible and to avoid the hazard if elimination is not possible.

However, the considerable time spent determining the state of the vehicle and its environment detracts from the time available for rescuing or giving emergency care to any injured occupants of the vehicle or other personnel involved in the incident. Prompt care is especially important early in the response, so that any injuries may be stabilized and further injury or damage may be prevented.

It is an object in certain implementations of the invention to provide a system that quickly and efficiently apprises emergency responders and other personnel of the state of the onboard battery system, and in particular, informs responders as to whether a non-nominal condition exists. Although this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and apparatus that allows emergency responders to an incident scene involving an electric vehicle to quickly determine the status of a high voltage vehicle battery without coming into contact with the vehicle. The system provides a short range wireless system controller in communication with a battery controller. The short range wireless system controller is further in communication with equipment installed in the vehicles or handheld receiving units of the emergency responders via broadcast over a short range wireless RF network.

In operation, upon detecting that a vehicle with a high voltage battery has been involved in a physical incident potentially involving damage, the short range wireless system controller queries the battery controller to discover certain predetermined battery physical parameters and battery control parameters. These battery parameters are then used to determine if the battery has suffered any damage that may render the vehicle inoperable. This battery damage information is then broadcast over the short range wireless RF network to the receivers installed in the vehicles or receiving units of the emergency responders.

In this way, emergency responders can quickly care for incident victims without being forced to take time beforehand to determine whether or not the high voltage battery is in a nominal state after the crash. Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for apprising emergency responders to an incident scene involving an electric vehicle of the status of a high voltage vehicle battery without requiring proactive testing of the vehicle or the immediate environment, and without any need to physically contact the vehicle. The responder is associated with a hand-held or vehicle-mounted receiver for receiving a short range wireless broadcast from a system controller in the vehicle. The system controller is linked in turn to the vehicle battery controller. In this way, the vehicle battery controller is able to notify the system controller of any non-nominal conditions relating to the battery, such as rupture, short, cell separation and so on. The system controller then communicates this information to the hand-held or vehicle-mounted receivers of the emergency responders via short range wireless broadcast. In this way, emergency responders have knowledge of the condition of the electric vehicle after an incident.

Figure 1:
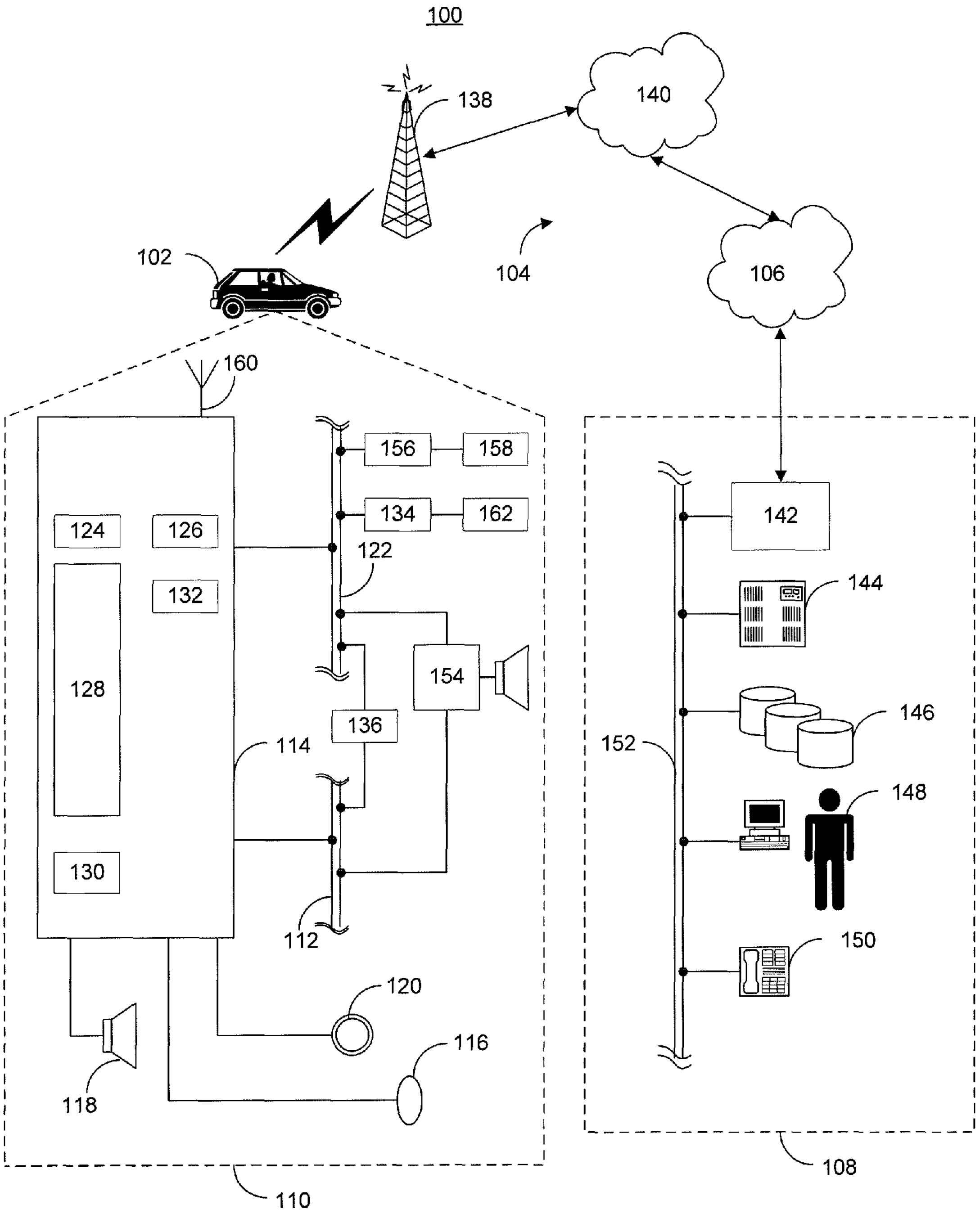
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
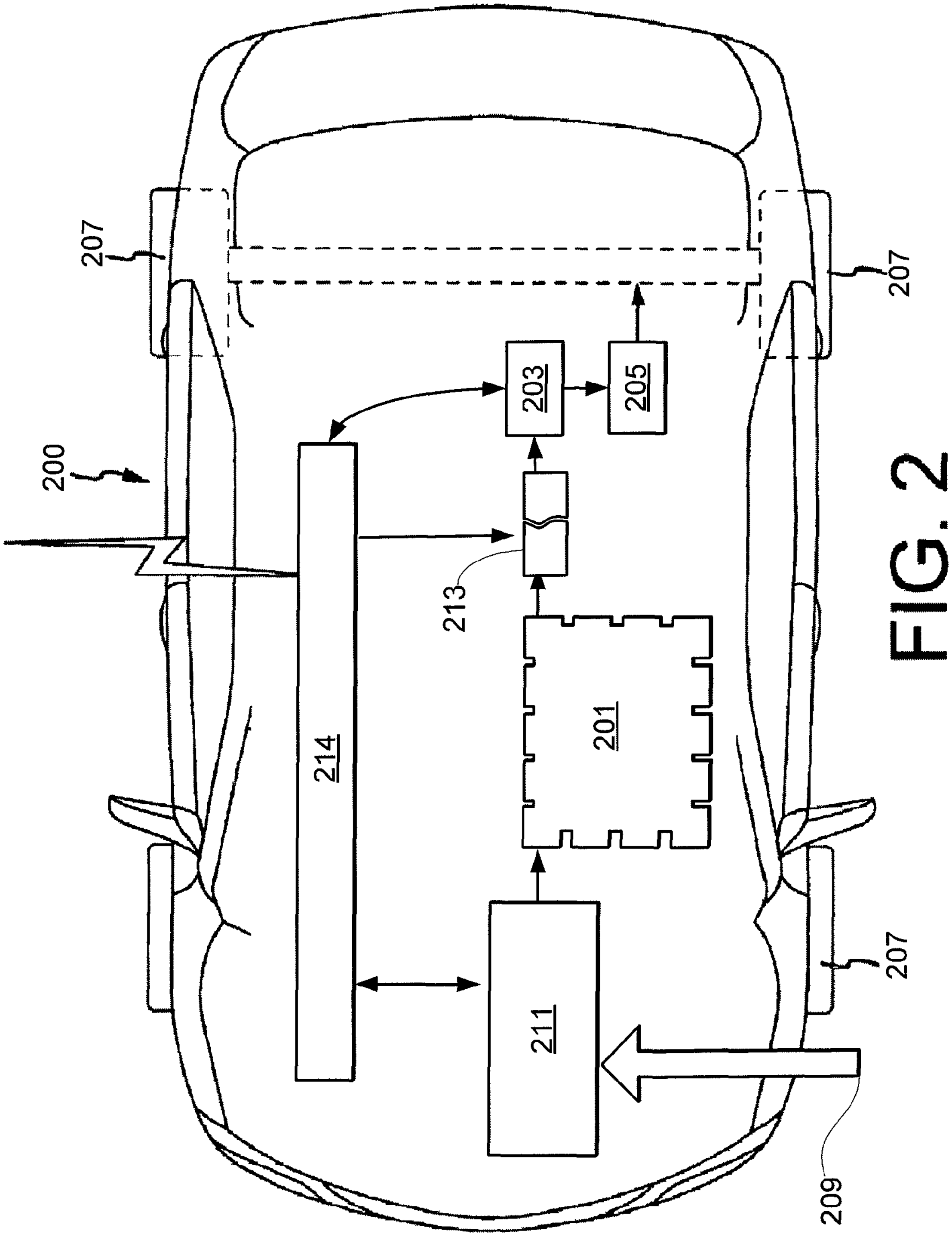
FIG. 2 is a schematic vehicle diagram showing relevant power links and communications linkages within the vehicle and between the vehicle and a remote entity.

As noted above, the telematics unit 114 and associated components are associated in an implementation of the invention with a vehicle 102. In particular, the vehicle 102 is a hybrid-electric or electric vehicle. FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 200 (102) includes an electrical energy storage system 201 which is a battery or battery bank ("battery") of suitable voltage and capacity. Suitable battery types include but are not limited to lead acid batteries, Nickel Cadmium batteries (NiCd), Nickel Metal Hydride batteries (NiMH), Lithium Ion batteries and Lithium Polymer batteries.

The battery 201 is conductively linkable, e.g., via a controller 203, to an electrical drive unit 205, e.g., an electrical motor or motors. The electrical energy may be modulated, voltage-modified, or otherwise modified by the controller 203 as needed to drive the electrical drive unit 205. The electrical drive unit 205 is linked or linkable to a ground engaging drive, typically including one or more wheels 207.

In one optional implementation, a plug interface 209 is provided in order to charge the battery 201, although it will be appreciated that the teachings herein apply beyond vehicles having plug-in architectures as well. The plug interface 209 is linked to the battery 201 via a charge controller 211. The telematics unit 214 (114) is adapted to receive information from the controller 203 as discussed above and to convey data regarding the battery to emergency responder units when appropriate.

An aspect of the vehicle 200 and battery 201 is the ability to electrically disconnect the high voltage of the battery 201 from the rest of the car by controlling at least one and preferably two or more high voltage contactors 213 if an adverse condition is detected. For example, as discussed in greater detail below, the controller 203 may monitor battery parameters such as voltage (or voltages within multiple cells), currents, pack temperature etc., to determine if any of these parameters indicates a problem requiring the battery 201 to be disconnected. The controller 203 may also monitor, or be linked to an entity that does monitor, important vehicle parameters that may impact battery operation such as acceleration or deceleration (e.g. to detect a collision), vehicle attitude and orientation (e.g. to detect rollover), interior climate conditions including smoke, humidity, moisture and so on. In an example, the controller 203 may monitor battery and vehicle parameters via vehicle bus 122.

In the event that the battery parameter or vehicle parameter sensors detect a condition requiring disconnect, the controller 203 may activate the high voltage battery contactors 213 to disconnect the high voltage of the battery pack 201 from the car. With some designs, the high voltage contactors 213 must be electrically activated in order to open (default closed), while in other cases the high voltage contactors 213 must be electrically activated in order to close (default open).

Figure 3:
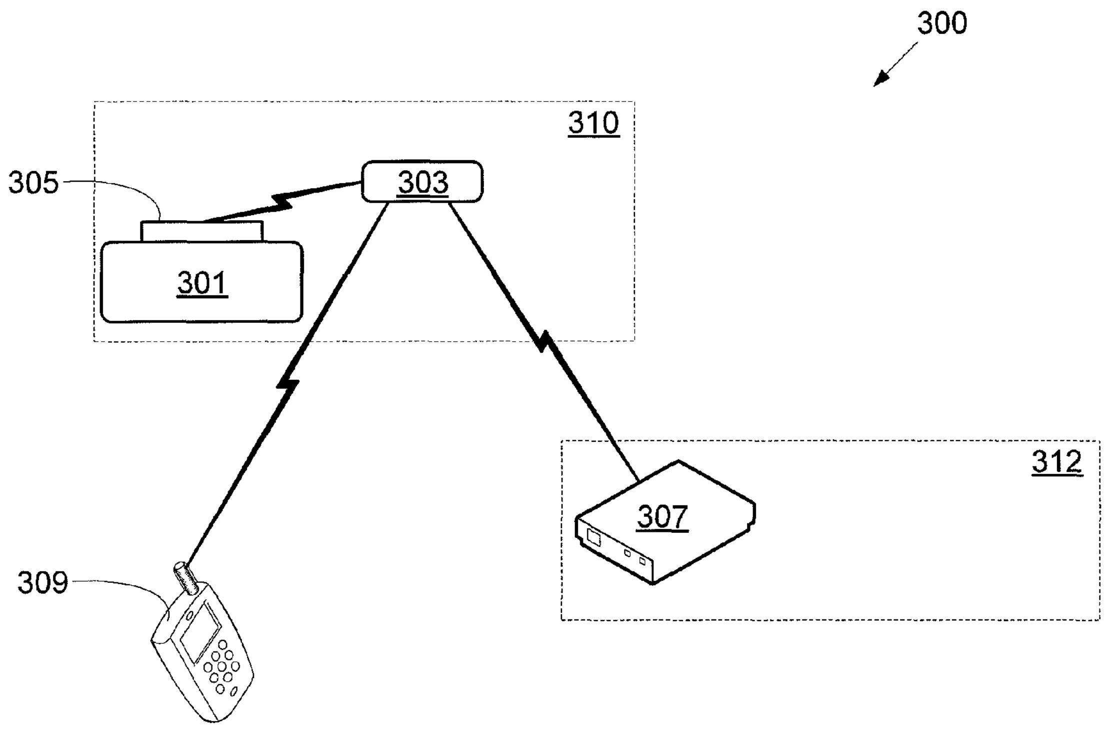
FIG. 3 is a simplified schematic diagram of the battery state notification system in an implementation of the described principles.

With further reference to the architecture of FIGS. 1 and 2, and turning more specifically to FIG. 3, a schematic diagram of the battery state notification system is shown in simplified form. In addition to the battery 301 within the vehicle of interest 310, the system 300 comprises a short range wireless system controller 303 in communication with a battery controller 305. The system controller 303 may be the same as or part of the controller 203, or may be a separate entity. In any case, either or both controllers 203, 303 may be located within the vehicle telematics unit 114.

The battery controller 305 is physically linked to the battery 301 to obtain battery status information, i.e., to detect battery temperature, cell damage, such as cell rupture, cell shorting, circuit damage outside the battery 301, e.g., shorting in the circuit. Measurement of these parameters can be executed via voltage and current sensors incorporated in the battery controller 305, as well as via one or more temperature probes. Sensors may also be employed to detect the physical or electrical separation of the battery controller 305 from the battery 301, in which case the vehicle electrical system may be in a state outside of operating ranges set by the designer.

The short range wireless system controller 303 is further in communication with equipment installed into the vehicles or handheld receiving units of the emergency responders via broadcast over a short range wireless RF network. In the illustrated arrangement, the equipment associated with emergency responders includes one or both of an in-vehicle unit 307 within responder vehicle 312 and a handheld RF communication device 309 carried by a responder.

The communications between the battery controller 305, system controller 303, and emergency responder equipment (307, 309) may be executed via any wireless protocol having suitable range and power properties. In an implementation, the communication between the battery controller 305 and the system controller 303 are executed via BlueTooth, while the communication between the system controller 303 and the emergency responder equipment (307, 309) are executed via WiFi or other moderate range protocol. It will be appreciated that the system controller may communicate with the battery controller via the vehicle bus 122.

Figure 4:
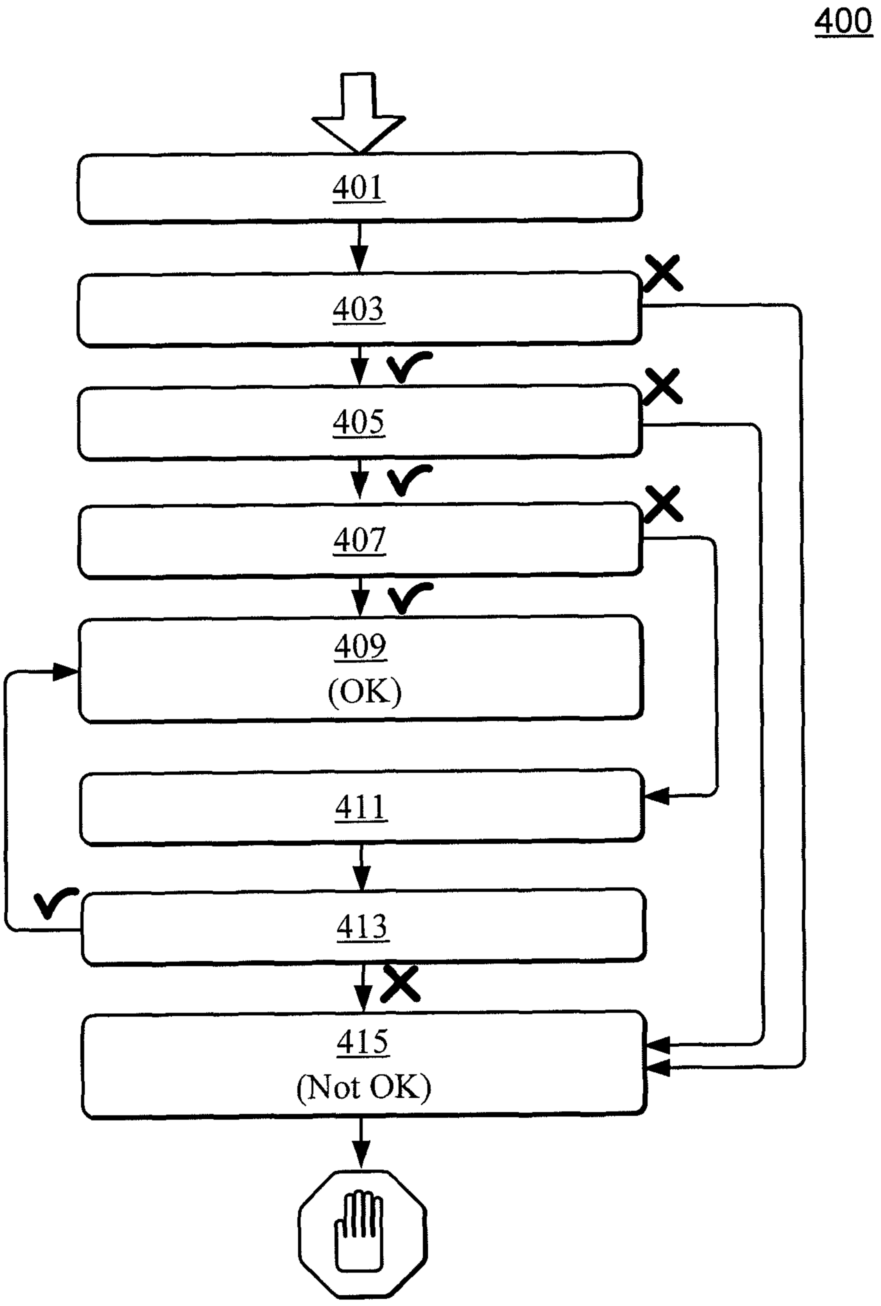
FIG. 4 is a flowchart illustrating a process of remotely apprising emergency responder personnel of the status of a battery or battery system in accordance with an implementation of the described principles.

Turning to FIG. 4, a process 400 is shown for assessing and conveying battery status or associated vehicle status to a first responder. At stage 401 of the process, the system controller 303 of the vehicle 310 senses a collision potentially causing vehicle damage. The collision may be sensed by sensing the deployment of airbags or other elements configured to respond in the event of a collision.

Having detected a collision, the system controller 303 attempts to contact the battery controller 305 at stage 403 to determine the extent of the damage, if any, to the vehicle electrical power and distribution system, i.e., the battery and associated power distribution circuitry. If the system controller 303 is unable to contact the battery controller 305, the process flows to stage 415, to be discussed later. If the system controller 303 is able to contact the battery controller 305, the process flows instead to stage 405, wherein the system controller 303 requests a status from the battery controller 305.

If the battery controller 305 is in communication with the system controller 303 but is unable to supply a status of the battery 301, the process flows to stage 415. Otherwise, the process 400 flows to stage 407. At stage 407, the system controller 303 receives a battery status report and determines whether the status is indicative of a non-nominal condition, i.e., a short to the vehicle frame, a ruptured cell, a rapidly increasing battery temperature, etc. If the battery status report is not indicative of a non-nominal condition, the system controller 303 transmits a message to the emergency responder communications device indicating that the vehicle is nominal condition at stage 409.

If on the other hand, the battery status report is indicative of a non-nominal condition, the system controller 303 actuates the battery contactors to open at stage 411 and reanalyzes battery status at stage 413. If the battery status is no longer indicative of a non-nominal condition, the system controller 303 returns to stage 409 and transmits a message to the emergency responder communications device indicating that the vehicle battery is isolated.

If instead the battery status remains indicative of a non-nominal condition, the process 400 flows to stage 415, wherein the system controller 303 transmits a message to the emergency responder communications device indicating that the vehicle is not isolated.

It will be appreciated that the described system allows emergency responders to be given a status of an electric vehicle after a collision without being required to test the vehicle and its environment. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for verifying a status of an electric vehicle for approach by emergency personnel after a collision involving the vehicle, the vehicle having a battery power system including one or more batteries configured to supply electrical power to a vehicle drive system, the method comprising:

- collecting a value of each of one or more battery parameters of the battery power system via a battery controller mounted to a battery, wherein the battery controller includes a wireless link capability;
- transmitting, via the wireless link, the collected values from the battery controller to a system controller;
- deriving, by the system controller, a vehicle battery power system status based on the collected values at the system controller;
- taking a corrective action to isolate the battery if the vehicle battery power system status is indicative of a non-nominal condition and thereafter:
  - issuing, from the system controller for receipt by an emergency responder communication device, a successful battery isolation message affirmatively stating that the battery is isolated from the rest of the vehicle only if the corrective action successfully isolated the battery, and
  - issuing, from the system controller for receipt by an emergency responder communication device, an unsafe battery warning stating the vehicle battery power system status if the corrective action did not successfully isolate the batter from the rest of the vehicle; and
- otherwise issuing, from the system controller for receipt by an emergency responder communication device, a message indicating that the vehicle is in nominal condition if the vehicle battery power system status is indicative of a nominal condition.

2. The method according to claim 1, wherein the emergency responder communication device is a handheld device.

3. The method according to claim 1, wherein the emergency responder communication device is a vehicle-mounted device.

4. The method according to claim 1, wherein the wireless link capability includes a short range link.

5. The method according to claim 4, wherein the wireless link capability includes a Bluetooth link.

6. The method according to claim 1, wherein the collected values include battery voltage, battery current, battery temperature and cell condition.

7. The method according to claim 1, wherein the collected values include physical connectivity of the battery controller to the battery.

8. The method according to claim 1, wherein the collected values include electrical connectivity of the battery controller to the battery.

9. The method according to claim 1, wherein the battery is associated with one or more high voltage contactors and wherein the collected values indicate a battery condition, the method further comprising activating the one or more high voltage contactors to decouple the battery from vehicle power circuitry.

10. A method for verifying a status of an electric vehicle for approach by emergency personnel after a collision involving the vehicle, the vehicle having a battery power system including one or more batteries configured to supply electrical power to a vehicle drive system and a battery controller mounted to the battery, wherein the battery controller is linked to an in-vehicle system controller, the method comprising:

- collecting a value of each of one or more battery parameters of the battery power system from the battery controller via the system controller;
- deriving, by the system controller, a vehicle battery power system status based on the collected values at the system controller;
- taking a corrective action to isolate the battery if the vehicle battery power system status is indicative of a non-nominal condition and thereafter:
  - issuing, from the system controller for receipt by an emergency responder communication device, a successful battery isolation message affirmatively stating that the battery is isolated from the rest of the vehicle only if the corrective action successfully isolated the battery, and
  - issuing, from the system controller for receipt by an emergency responder communication device, an unsafe battery warning stating the vehicle battery power system status if the corrective action did not successfully isolate the battery from the rest of the vehicle; and
- otherwise issuing, from the system controller for receipt by an emergency responder communication device, a message indicating that the vehicle is in nominal condition if the vehicle battery power system status is indicative of a nominal condition.

11. The method according to claim 10, wherein the emergency responder communication device comprises one of a handheld device and a vehicle-mounted device.

12. The method according to claim 10, wherein the battery controller is linked to the system controller via a short range wireless link.

13. The method according to claim 12, wherein the short range wireless link includes a Bluetooth link.

14. The method according to claim 10, wherein the collected values include one or more of battery voltage, battery current and battery temperature.

15. The method according to claim 10, wherein the collected values include one or more of physical connectivity of the battery controller to the battery and electrical connectivity of the battery controller to the battery.

16. The method according to claim 10, wherein the battery is associated with one or more high voltage contactors, the method further comprising activating the one or more high voltage contactors to decouple the battery from vehicle power circuitry prior to broadcasting the vehicle status from the system controller.

17. A system for apprising one or more emergency responders of a status of an electric vehicle after a collision involving the vehicle, the vehicle having one or more high voltage batteries to supply electrical power to a vehicle drive system, the system comprising:

- a battery controller mounted to the battery configured to collect a value of each of one or more battery parameters, and having a short range wireless link capability; and
- an in-vehicle system controller configured to collect data from the battery controller via the wireless link capability of the battery controller, to derive a status of the vehicle based on the collected data, to issue a message from the system controller for receipt by an emergency responder communication device indicating that the vehicle battery power system is in nominal condition if the vehicle battery power system status is not indicative of a non-nominal condition, to take a corrective action to address a non-nominal condition, to issue a message for receipt by an emergency responder communication device indicating that the vehicle battery is isolated from the rest of the vehicle if the corrective action was successful in isolating the vehicle battery, and to issue a message indicating a non-nominal vehicle battery power system status for receipt by an emergency responder communication device if a non-nominal condition is not successfully addressed through a corrective action, the in-vehicle system controller further comprising a wireless link for transmitting the status of the vehicle to an emergency responder communication device.

18. The system according to claim 17, wherein the collected values include battery voltage, battery current, battery temperature and cell condition.

19. The system according to claim 17, wherein the collected values include physical and electrical connectivity of the battery controller to the battery.

20. The system according to claim 17, further including one or more high voltage contactors to decouple the battery from vehicle power circuitry, wherein the system controller is further configured to activate the one or more high voltage contactors to decouple the battery from vehicle power circuitry when the collected values indicate a non-nominal electrical condition.

* * * * *